(12) United States Patent
Hoover et al.

(10) Patent No.: US 7,047,876 B2
(45) Date of Patent: May 23, 2006

(54) TORSION BAR ACTIVATED ROUND BALER KICKER

(75) Inventors: Larry L. Hoover, Landisville, PA (US); Fred M. Horchler, Jr., Lancaster, PA (US)

(73) Assignee: CNH America LLC, New Holland, PA (US)

( * ) Notice: Subject to any disclaimer, the term of this patent is extended or adjusted under 35 U.S.C. 154(b) by 102 days.

(21) Appl. No.: 10/789,677

(22) Filed: Feb. 28, 2004

(65) Prior Publication Data

US 2005/0188862 A1   Sep. 1, 2005

(51) Int. Cl.
*B30B 5/04* (2006.01)

(52) U.S. Cl. .................. 100/87; 100/100; 56/341

(58) Field of Classification Search ............ 100/87, 100/88, 89, 100; 56/341–344; 193/4, 5, 193/16; 198/861.3
See application file for complete search history.

(56) References Cited

U.S. PATENT DOCUMENTS

| 3,156,346 | A | 11/1964 | McDuffie | 198/223 |
|---|---|---|---|---|
| 3,411,436 | A | 11/1968 | Fisher | 100/188 |
| 4,092,050 | A | 5/1978 | Sobeck | 298/18 |
| 4,202,578 | A | 5/1980 | Roullier et al. | 296/37.16 |
| 4,206,587 | A | 6/1980 | Freimuth et al. | 56/341 |
| 4,208,862 | A | 6/1980 | Waldrop et al. | 56/341 |
| 4,218,866 | A | 8/1980 | Parrish | 56/341 |
| 4,406,221 | A | 9/1983 | Parrish et al. | 100/88 |
| 4,458,587 | A | 7/1984 | Jennings | 100/88 |
| 4,483,247 | A | 11/1984 | Coeffic | 100/88 |
| 4,566,380 | A | 1/1986 | Clostermeyer et al. | 100/89 |
| 4,683,815 | A | 8/1987 | Van Ryswyk | 100/88 |
| 4,770,093 | A | 9/1988 | Gunther et al. | 100/88 |
| 4,798,044 | A | 1/1989 | Viaud et al. | 56/341 |
| 4,821,637 | A | 4/1989 | Viund | 100/88 |
| 5,138,842 | A | 8/1992 | Wruck et al. | 100/88 |
| 6,487,754 | B1 | 12/2002 | Keen | 16/306 |
| 6,807,901 | B1 * | 10/2004 | Bentzinger et al. | 100/40 |

* cited by examiner

*Primary Examiner*—Derris H. Banks
*Assistant Examiner*—Jimmy T. Nguyen
(74) *Attorney, Agent, or Firm*—Stephen A. Bucchianeri; John William Stader; Michael G. Harms

(57) ABSTRACT

A bale kicker for a round baler that employs an adjustable torsion bar, or bars, to impart a rearward force to an exiting bale to ensure that the completed bale is clear of the baler.

16 Claims, 4 Drawing Sheets

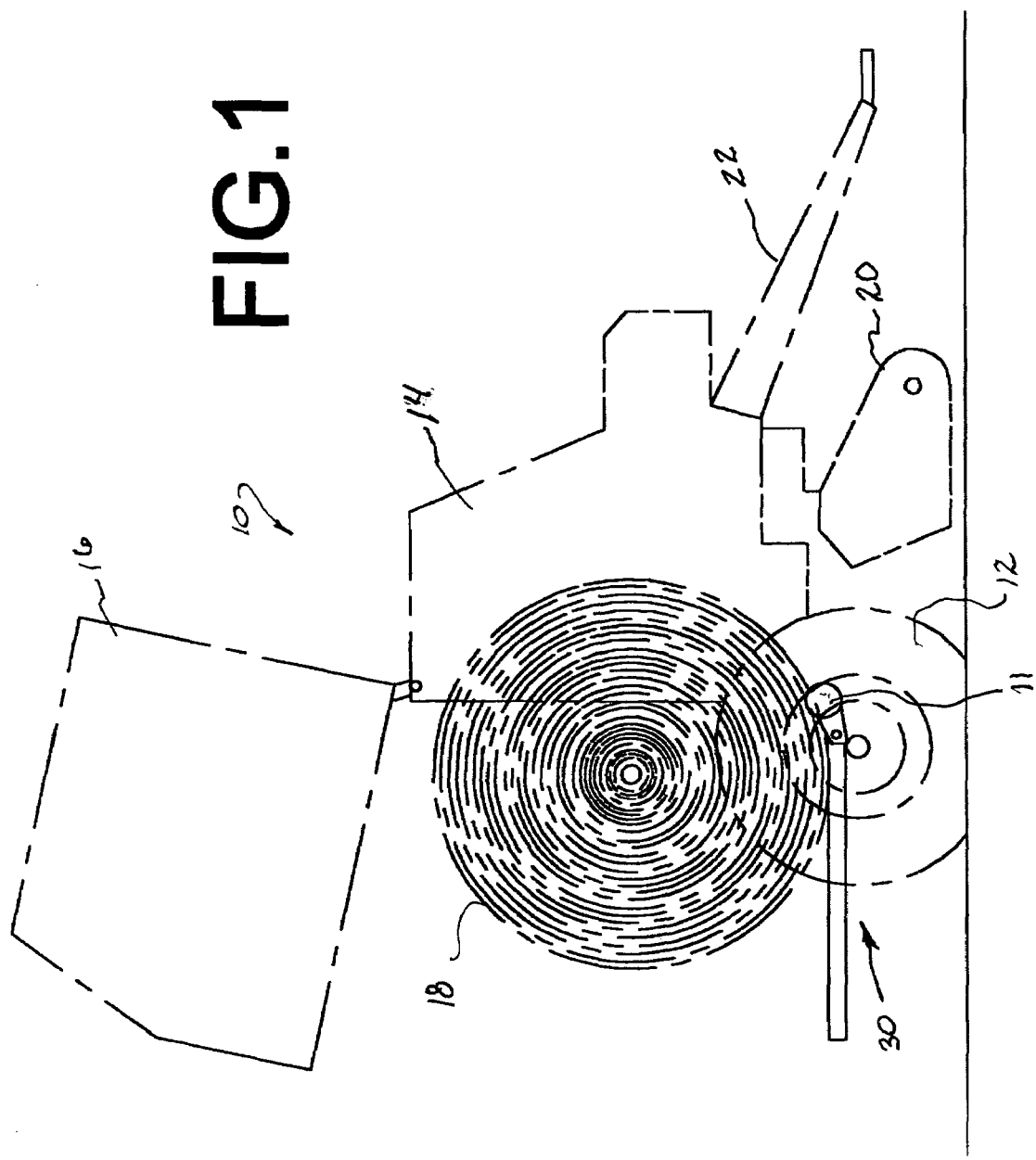

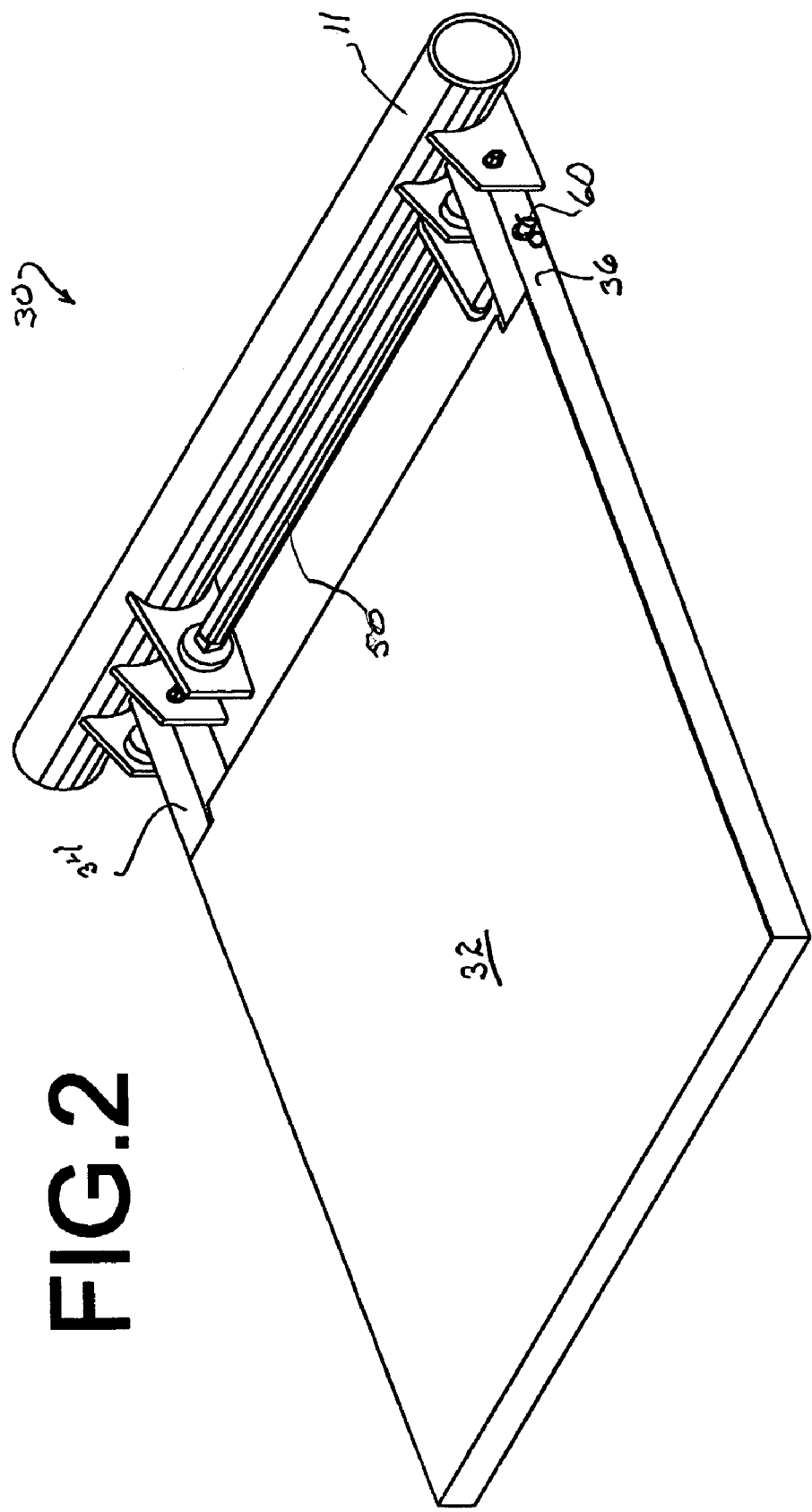

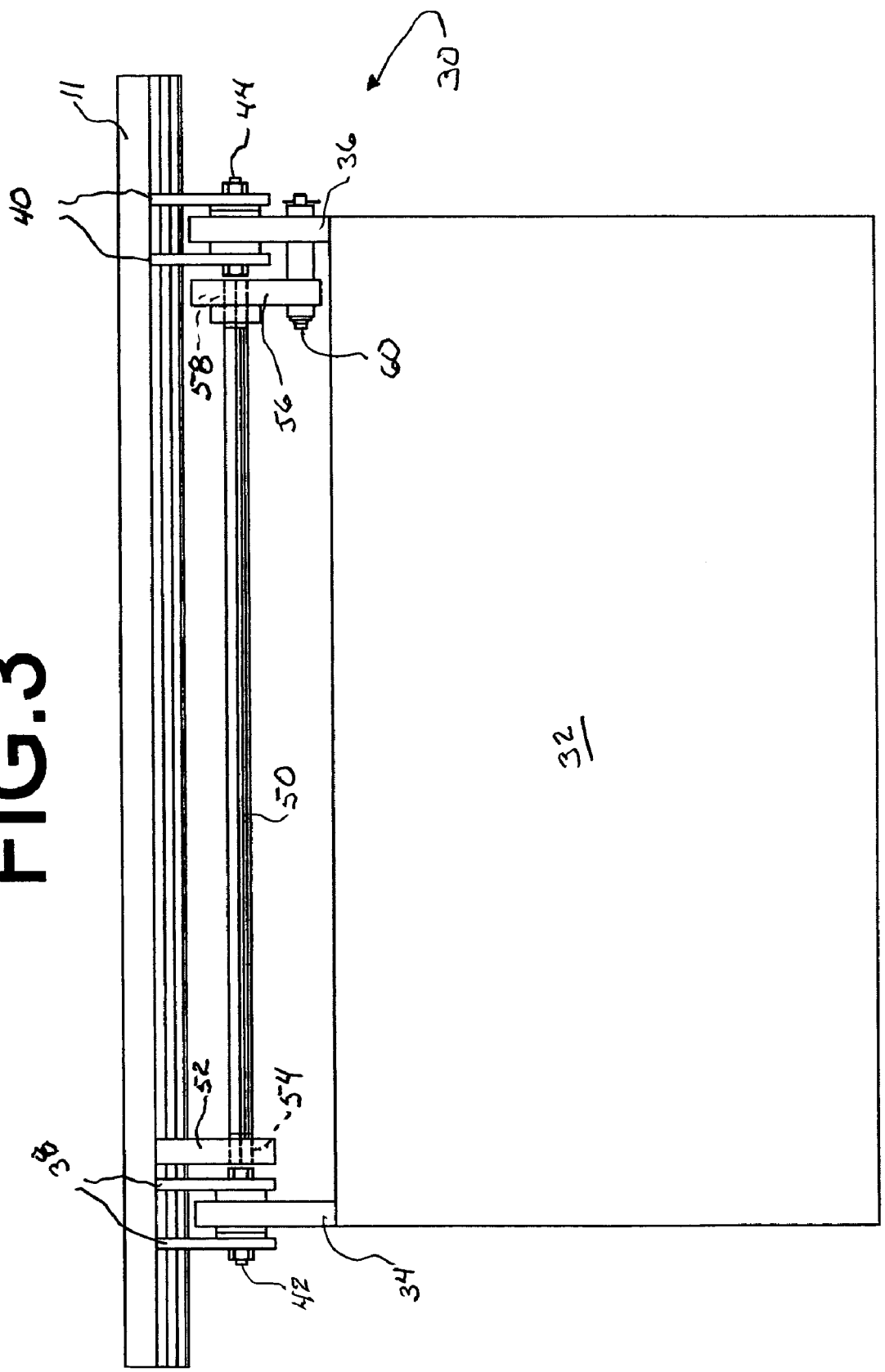

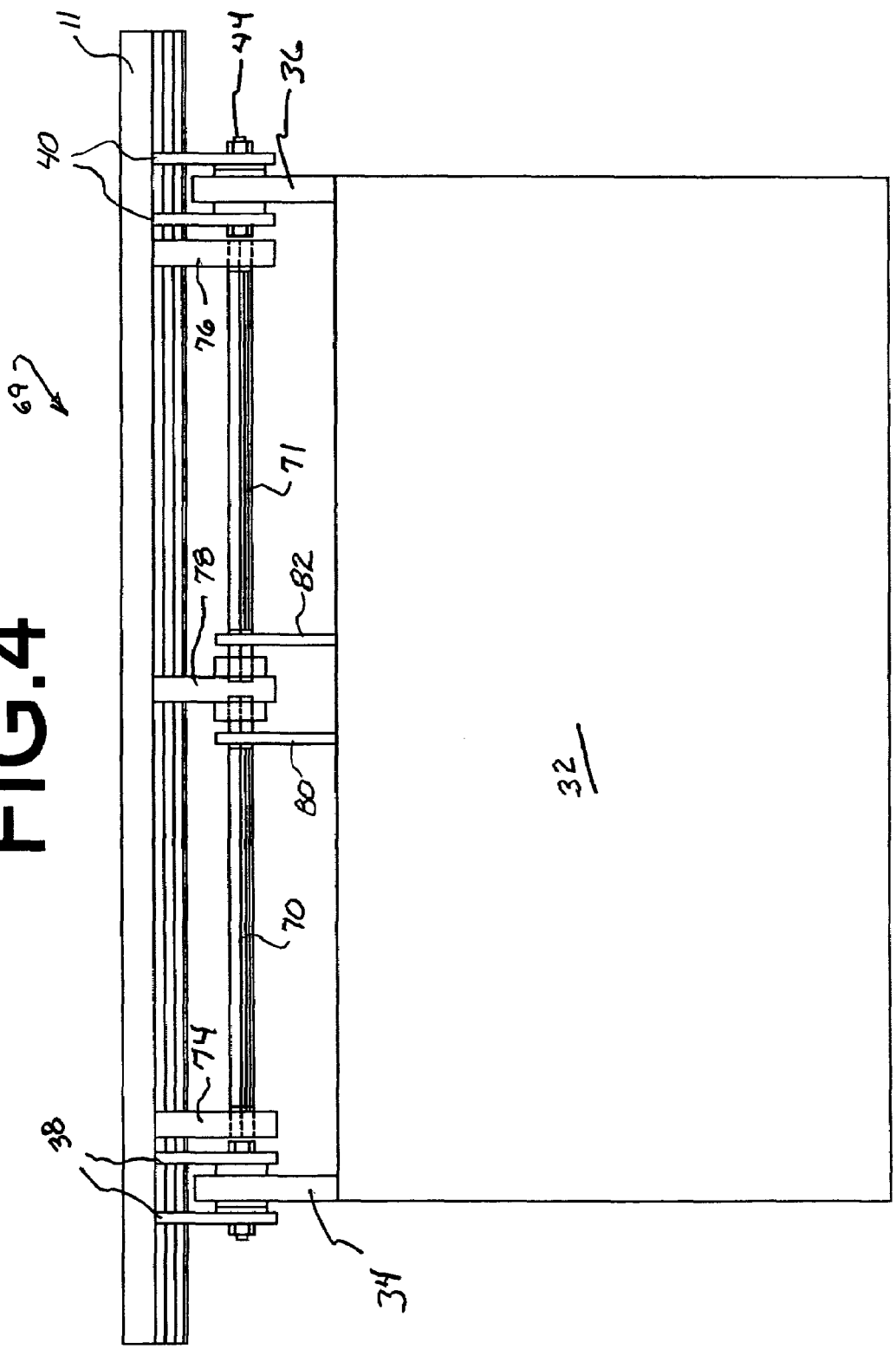

TORSION BAR ACTIVATED ROUND BALER KICKER

BACKGROUND OF THE INVENTION

The present invention relates generally to round balers, and more particularly to a device on such machines for "kicking" bales as they exit the baler to assure that the bale is spaced from the baler.

At the completion of the bale-forming cycle, most round balers open the rear portion of the bale-forming chamber, referred sometimes to the tailgate, and eject the bale onto the ground. If the tailgate is too close to the ejected bale, the tailgate cannot be closed, and entire baler must be moved ahead before starting the bale-formation process. The problem is that by moving the baler ahead without closing the tailgate, some crop is missed and thus left out of the process. Some balers use a pivotable ramp that directs the bale rearward upon ejection. Such designs are usually spring biased into the rest position. The problem with this design are that it does not work well when operating the baler on a downward incline, i.e., the bale does not roll away from the baler, but rather stops immediately or rolls back toward the baler.

Bale kickers have been used on round balers for several years to push the finished bales rearwardly from the baler to provide the space necessary to close the tailgate and initiate the next baling process without having to move the baler and bypass crop material on the ground. U.S. Pat. No. 4,206,587 to Freimuth et al. shows several bale kickers that are pivotable between raised and lowered positions and biased by springs toward the raised position. Prior kickers, such as shown in Freimuth et al. and, for another example, U.S. Pat. No. 4,458,587 to Jennings, are fairly complex and thus costly additions to the basic baler.

It would be quite beneficial to have a bale kicker that significantly reduces the complexity and cost of prior known bale kickers, and consistently provides the force necessary to push the bale an adequate distance away from the baler to allow effective and efficient operation of the baler in all kinds of operating conditions.

SUMMARY OF THE INVENTION

Accordingly, it is an object of the present invention to provide a bale kicker for round balers that uses a torsion bar, or bars, to provide impetus to the bale being ejected.

Another object of the present invention is to provide a bale kicker that requires no operator intervention to ensure proper operation.

It is another object of the instant invention to provide a bale kicker for a round baler that is more simplified in structure and reliable in us than previously known bale kickers.

It is still another object of the instant invention to provide a bale kicker wherein the kicking force may be adjusted by simple steps.

It is an even still further object of the instant invention to provide an improved bale kicker for a round baler that is durable in construction, inexpensive of manufacture, care-free of maintenance, facile in assemblage, and simple and effective to set up, adjust and use.

These and other objects are attained by providing a bale kicker for a round baler that employs an adjustable torsion bar, or bars, to impart a rearward force to an exiting bale to ensure that the completed bale is clear of the baler.

DESCRIPTION OF THE DRAWINGS

The advantages of this invention will be apparent upon consideration of the following detailed disclosure of the invention, especially when taken in conjunction with the accompanying drawings wherein:

FIG. 1 is a partial side elevational view of a round baler showing a side view of the bale kicker of the instant invention;

FIG. 2 is a rear perspective view of one embodiment of the bale kicker of the instant invention;

FIG. 3 is a top plan view of the bale kicker of FIG. 1; and

FIG. 4 is a top plan view of a second embodiment of a kicker of the instant invention

DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

FIG. 1 shows a round baler 10 including a first embodiment of the present invention. Round baler 10 is of conventional design, many of which are well-known in the prior art. For example, U.S. Pat. No. 4,458,587 includes a fairly detailed description of a round baler to which the present invention could easily be adapted. The round baler 10 shown in FIG. 1 is a generalized presentation, most specific details being known in the art and unnecessary for a full understanding of the invention.

Baler 10 has a main frame (not shown in detail) and a transverse axle 11 carrying a pair of wheels 12. In turn, the main frame supports a clam shell-like bale-forming chamber comprised of a fixed forward portion 14 and pivotable rearward tailgate 16. Inside the bale-forming chamber are the various belts, cams, etc. that form a bale, as at 18. The tailgate 16 is in the down, or closed, position during bale formation, and is hydraulically raised to the upper position, the position shown, for ejection of the completed bale. A crop pickup 20 moves the material to be baled from the field into the bale-forming chamber where it is incorporated into the bale. A tongue 22 is affixed to forward portion of the main frame for attachment to a tractor or other motive vehicle.

The purpose of bale kicker 30 is to engage the completed bale as it is ejected from the baler and impart a rearward force thereto to ensure that the bale is clear of the rear of the baler when the tailgate 16 of the bale-forming chamber closes.

Referring now to FIGS. 2 and 3, a first embodiment can be seen to comprise a generally flat ramp 32 with a pair of forwardly extending arms 34, 36. A pair of axle brackets 38, 40 affixed, as by welding for example, to axle 11 pivotably hold arms 34, 36, respectively, by bolts 42, 44. Bearings are included on bolts 42, 44 and spacers as required to maintain a stable pivotable connection.

A torsion bar 50 is fixed to a support arm 52 which is, in turn, affixed to axle 11. Torsion bar 50 is formed with hex-shaped ends and support arm 52 has a hole therethrough 54 with a matching hex configuration so that one end of the torsion bar and support arm 52 remain in a fixed position. A coupler 56 interconnects the other end of torsion bar 50 and arm 36 such that movement of ramp 32 causes the torsion bar 50 to twist, thus winding the torsion bar and loading it with kinetic energy. The hex-shape of the end of the torsion bar 50 fits in a hex-shaped hole 58 in coupler 56 (like the other end). The coupler 56 is attached to arm 36 by bolt 60, with appropriate spacers. While the shape of the end of the torsion bar is identified as hex or hexagonal, it may be any multifaceted configuration, such as, as an additional example, octagonal, so long as the connections that it is part of are strong and non-slipping.

In operation, round baler 10 is pulled across the field of mown crop material which is fed into the bale-forming chamber where the bale is formed. Upon completion of the formation process, the tailgate 16 of the bale chamber opens and the bale is ejected. As the bale exits, it drops onto ramp 32 of the bale kicker, causing it to rotate about bolts 42, 44, and inputting torsion on the torsion bar 50. The ramp, in the configuration shown in FIG. 1, moves approximately 35°, though it could be more or less in other configurations. As the bale continues its rearward movement, some of the weight is transferred to the ground (as the weight of the bale moves from the ramp to the ground) and when adequate weight is transferred to the ground, the tension in the torsion bar is released and it "kicks" the bale rearwardly.

A second embodiment 69, using two axially-aligned shorter torsion bars 70, 71, of the invention is depicted in FIG. 4. In this configuration, ramp 32 is supported by the same axle brackets 38, 40 and arms 34, 36 as the embodiment of FIGS. 2 and 3, and each outside end of the respective torsion bars is held in position by supports 74, 76 in a manner similar to torsion bar 50 by support 52. The inside ends of the respective torsion bars are held in horizontal and vertical position by bracket 78 that is fixed to axle 11. The inside ends of torsion bars 70, 71 are free to rotate within bracket 78. A pair of support plates 80, 82, affixed to ramp 32, has a hex-shaped hole therethrough into which the respective hex-shaped torsion bar end is fixed, such that pivoting of ramp 32 puts tension into the torsion bars for providing the "kicking" force necessary to roll the bale away from the baler.

The amount of the tension that the torsion bar(s) is allowed to temporarily absorb depends upon a number of variables. For instance, by careful selection of the diameter, cross-sectional shape, length and materials of the torsion bar, the dynamics of the bar itself can be changed. By adjusting the position of the table relative to horizontal in the rest, or unloaded condition, the amount of tension imparted to the torsion bar, and thus the force of the "kick", can be adjusted. This could be accomplished in several ways; however, the simplest procedure would be to remove the torsion bar, raising or lowering the table to the desired position, then replacing the torsion bar to hold the table in the new position. Finally, the weight of the bale has a significant impact on the amount of force needed or desired to impart, and may require adjustment of the hardware.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. In a round baler for movement across the ground and formation of cylindrical bales of crop material, the baler having a wheel assembly including a transverse axle, a clam shell-like bale-forming chamber supported on the axle and including a forward portion and a tailgate vertically pivotable between a closed position for forming round bales and an open position for bale ejection, a bale kicker generally vertically pivotably connected to the axle for contacting a bale during its ejection from the bale-forming chamber and for propelling it rearwardly of the baler, the improvement comprising:

the bale kicker including:
a generally flat table-like ramp affixed to the axle for generally free vertical pivotal movement between a closed position where it is approximately horizontal or slightly above horizontal, and an open position where it is below horizontal, generally in contact with the ground;
a first generally transverse torsion bar with a longitudinal axis generally parallel to the transverse axle and having a first end affixed to the axle, and an opposing second end affixed to the ramp, said torsion bar further having a multifaceted portion on each of the first and second ends
a pair of spaced-apart axle brackets are rigidly affixed to the axle and extend generally rearwardly away therefrom and are pivotably connected to the ramp such that the ramp may pivot vertically about the axle brackets;
a support arm is rigidly affixed to the axle and extends generally rearwardly away therefrom generally between and parallel to the pair of axle brackets; and
the support arm has a hole therethrough matching the multifaceted shape of the first end of the torsion bar, and the first end of the torsion bar extends through the hole in the axle bracket, whereby pivotal movement of the ramp from the closed position toward the open position imparts a twist to the torsion bar such that movement of the ramp between the closed position and the open position imparts a twist to the torsion bar that provides a kick to the ejected bale as it moves off the ramp onto the ground, that kick being the impetus for bale ejection.

2. The improvement of claim 1, wherein:
the second end of the torsion bar is affixed to the ramp by a coupler that has a first end and an opposing second end;
the coupler has a hole therethrough adjacent the first end of the coupler matching the multifaceted shape on the second end of the torsion bar and the second end of the torsion bar extends through the hole in the coupler; and
the second end of the coupler connected to the ramp to allow the table to pivot between the closed position and the open position and impart a twist to the torsion bar.

3. The improvement of claim 2, wherein:
the ramp is generally rectangularly-shaped with a pair of parallel arms extending away therefrom and pivotally affixed to the axle.

4. The improvement of claim 3, wherein:
the torsion bar is generally located between the parallel arms of the ramp.

5. The improvement of claim 2, wherein:
the kicker includes a second torsion bar, and the first and second torsion bars are axially aligned.

6. In a round baler for movement across the ground and formation of cylindrical bales of crop material, the baler having a wheel assembly including a transverse axle, a clam shell-like bale-forming chamber supported on the axle and including a forward portion and a tailgate vertically pivotable between a closed position for forming round bates and an open position for bale ejection, a bale kicker generally vertically pivotably connected to the axle for contacting a bale during its ejection from the bale-forming chamber and for propelling it rearwardly of the baler, the improvement comprising:
the bale kicker including:
a generally flat table-like ramp affixed to the axle for generally free vertical pivotal movement between a closed position where it is approximately horizontal or slightly above horizontal, and an open position where it is below horizontal, generally in contact with the ground; and
first and second generally transverse torsion bars with aligned longitudinal axes generally parallel to the transverse axle, each having a first end affixed to the axle, and an opposing second end affixed to the ramp, such that movement of the ramp between the closed position and the open position imparts a twist to the torsion bars that provides a kick to the ejected bale as it moves off the ramp onto the ground, that kick being the impetus for bale ejection.

7. The improvement of claim 6, wherein:
each of the second ends of the torsion bars is affixed to the ramp by respective support plates that have first ends and opposing second ends;
each respective support plate has a hare therethrough adjacent the first end of the support plate matching the multifaceted shape on the second ends of the torsion bars and the second ends of the torsion bars extends through the hole in the respective support plate; and
the second ends of the support plates are connected to the ramp to allow the ramp to pivot between the closed position and the open position and impart a twist to the torsion bar.

8. The improvement of claim 7, wherein:
the ramp is generally rectangular with a pair of generally parallel arms extending away therefrom and pivotally affixed to the axle.

9. The improvement of claim 8, wherein:
the first and second torsion bars are generally located between the parallel arms of the ramp.

10. A round baler for movement across the ground and formation of cylindrical bales of crop material, the baler comprising:
a wheel assembly including a transverse axle;
a bale-forming chamber supported on the axle and including a forward portion arid a tailgate vertically pivotable between a closed position for forming round bales and an open position for bale ejection;
a bale kicker generally vertically pivotabiy connected to the axle for contacting a bale during its ejection from the bale-forming chamber and for propelling it rearwardly of the baler, the bale kicker comprising:
a generally flat table-like ramp affixed to the axle for generally free vertical pivotal movement between a closed position where it is approximately horizontal or slightly above horizontal, and an open position where it is below horizontal, generally in contact with the ground; and
a first generally transverse torsion bar with a longitudinal axis generally parallel to the transverse axle and having a first end affixed to the axle, and an opposing second end affixed to the ramp, the torsion bar further having a multifaceted portion on each of the first and second ends;
an axle bracket is rigidly affixed to the axle and extends generally rearwardly away therefrom; and
the axle bracket has a hole therethrough matching the multifaceted shape of the first end of the torsion bar, and the first end of the torsion bar extends through the hole in the axle bracket, whereby pivotal movement of the ramp from the closed position toward the open position imparts a twist to the torsion bar such that movement of the ramp between the closed position and the open position imparts a twist to the torsion bar that provides a kick to the ejected bale as it moves off the ramp onto the ground, that kick being the impetus for bale ejection.

11. The round baler of claim 10, wherein:
the second end of the torsion bar is affixed to the ramp by a coupler that has a first end and an opposing second end;
the coupler has a hole therethrough adjacent the first end of the coupler matching the multifaceted shape on the second end of the torsion bar and the second end of the torsion bar extends through the hole in the coupler; and
the second end of the coupler connected to the ramp to allow the table to pivot between the closed position and the open position and impart a twist to the torsion bar.

12. The round baler of claim 11, wherein:
the kicker includes a second torsion bar, and the first and second torsion bars are axially aligned.

13. A round baler for movement across the ground and formation of cylindrical bales of crop material comprising:
a wheel assembly including a transverse axle;
a bale-forming chamber supported on the axle and including a forward portion and a tailgate vertically pivotable between a closed position for forming round bales and an open position for bale ejection;
a bale kicker generally vertically pivotably connected to the axle for contacting a bale dunng its ejection from the bale-forming chamber and for propelling it rearwardly of the baler, the kicker comprising:
a generally flat table-like ramp affixed to the axle for generally free vertical pivotal movement between a closed position where it is approximately horizontal or slightly above horizontal, and an open position where it is below horizontal, generally in contact with the ground; and
first and second generally transverse torsion bars with aligned longitudinal axes generally parallel to the transverse axle, each having a first end affixed to the axle, and an opposing second end affixed to the ramp, such that movement of the ramp between the closed position and the open position imparts a twist to the torsion bars that provides a kick to the ejected bale as it moves off the ramp onto the ground, that kick being the impetus for bale ejection.

14. The round baler of claim 13, wherein:
each of the second ends of the torsion bars is affixed to the ramp by respective couplers that have first ends and opposing second ends;

the coupler has a hole therethrough adjacent the first end of the coupler matching the multifaceted shape on the second ends of the torsion bars and the second ends of the torsion bars extends through the hole in the coupler; and the second ends of the couplers are connected to the ramp to allow the ramp to pivot between the closed position and the open position and impart a twist to the torsion bar.

15. The round baler of claim 14, wherein:
the ramp is generally rectangularly shaped with a pair of parallel arms extending away therefrom and pivotally affixed to the axle.

16. The round baler of claim 15, wherein:
the first and second torsion bars are generally located between the parallel arms of the ramp.

* * * * *